United States Patent
Hong et al.

(10) Patent No.: US 9,227,135 B2
(45) Date of Patent: Jan. 5, 2016

(54) METHOD AND APPARATUS FOR PROVIDING A MIRROR-WORLD BASED DIGITAL BOARD GAME SERVICE

(71) Applicant: MOTIONBLUE INC., Seoul (KR)

(72) Inventors: Je Hoon Hong, Seoul (KR); Jung Hun Lee, Seoul (KR); Na Yeon Hong, Seoul (KR)

(73) Assignee: MOTIONBLUE INC., Seoul (KR)

( * ) Notice: Subject to any disclaimer, the term of this patent is extended or adjusted under 35 U.S.C. 154(b) by 0 days.

(21) Appl. No.: 14/496,691

(22) Filed: Sep. 25, 2014

(65) Prior Publication Data

US 2015/0011314 A1    Jan. 8, 2015

Related U.S. Application Data

(63) Continuation of application No. 14/188,530, filed on Feb. 24, 2014, now abandoned.

(30) Foreign Application Priority Data

Feb. 27, 2013    (KR) ........................ 10-2013-0021235

(51) Int. Cl.
*A63F 3/00* (2006.01)
*A63F 13/00* (2014.01)
*A63F 13/26* (2014.01)
*A63F 13/65* (2014.01)
*A63F 13/843* (2014.01)
*A63F 9/24* (2006.01)

(52) U.S. Cl.
CPC ........... *A63F 3/00643* (2013.01); *A63F 13/005* (2013.01); *A63F 13/26* (2014.09); *A63F 13/65* (2014.09); *A63F 13/843* (2014.09); *A63F 2003/00662* (2013.01); *A63F 2003/00719* (2013.01); *A63F 2003/00996* (2013.01); *A63F 2009/2486* (2013.01)

(58) Field of Classification Search
USPC .......................................................... 463/42
See application file for complete search history.

(56) References Cited

U.S. PATENT DOCUMENTS

| | | | |
|---|---|---|---|
| 6,690,156 B1 * | 2/2004 | Weiner et al. ............ | 324/207.17 |
| 2004/0248650 A1 * | 12/2004 | Colbert et al. .................. | 463/37 |
| 2006/0211464 A1 * | 9/2006 | Malobabic ...................... | 463/14 |
| 2008/0184124 A1 * | 7/2008 | Agarwal et al. ............... | 715/733 |
| 2008/0238885 A1 * | 10/2008 | Zachut et al. .................. | 345/174 |
| 2008/0280682 A1 * | 11/2008 | Brunner et al. ................. | 463/40 |
| 2010/0113148 A1 * | 5/2010 | Haltovsky et al. .............. | 463/30 |

(Continued)

*Primary Examiner* — Tramar Harper
(74) *Attorney, Agent, or Firm* — Mintz Levin Cohn Ferris Glovsky and Popeo, P.C.; Kongsik Kim; Jonathon Western

(57) ABSTRACT

Disclosed is a method for providing a minor-world based digital board game service at a server that is connected over a network with a common screen device and a multiple number of mobile terminals that includes: transmitting at least one of map information and game story information for a board game to the common screen device; receiving game progress information from the mobile terminals, once the arrangement of a multiple number of property blocks on a gameboard is completed according to the map information and a board game is started; and transmitting response information corresponding to the game progress information to the common screen device, where the common screen device recognizes the arrangement of the property blocks and the piece blocks that move over the property blocks, and displays an image corresponding thereto and an image corresponding to the response information.

14 Claims, 23 Drawing Sheets

(56) References Cited

U.S. PATENT DOCUMENTS

| | | | |
|---|---|---|---|
| 2011/0195763 A1* | 8/2011 | Kang et al. | 463/6 |
| 2012/0052931 A1* | 3/2012 | Jaqua et al. | 463/1 |
| 2012/0295684 A1* | 11/2012 | Richter et al. | 463/16 |
| 2013/0136300 A1* | 5/2013 | Wagner et al. | 382/103 |
| 2013/0217491 A1* | 8/2013 | Hilbert et al. | 463/31 |
| 2014/0094312 A1* | 4/2014 | Wouhaybi et al. | 463/42 |

\* cited by examiner

Create a Room

035 <AAA                                > <aaa>
019 <BBB                                > <bbb>
087 <CCC                                > <ccc>

Search
Game in Progress
Enter Room
Enter Room
Enter Room

FIG. 6A

| Room Name | |
|---|---|
| Password | |

Create a Room

| 035 <AAA | > <aaa> | Enter Room |
|---|---|---|
| 019 <BBB | > <bbb> | Enter Room |
| 087 <CCC | > <ccc> | Enter Room |

FIG. 6B

This is the objective of the game: Collect clues and find the answer to the following question:

Who has the "Golden Sword"?

START

METHOD AND APPARATUS FOR PROVIDING A MIRROR-WORLD BASED DIGITAL BOARD GAME SERVICE

CROSS-REFERENCE TO RELATED APPLICATIONS

This application is a continuation of U.S. application Ser. No. 14/188,530 filed on Feb. 24, 2014, which claims the benefit of Korean Patent Application No. 10-2013-0021235 filed on Feb. 27, 2013, which applications are incorporated herein by reference.

TECHNICAL FIELD

The present invention relates to a method and apparatus for providing a mirror-world based digital board game service, more particularly to a method and apparatus for providing a game by incorporating virtual reality and assembly blocks to a physical board game.

Related Art

Generally, a board game refers to a game played according to a particular set of rules with pieces or cards placed on a gameboard.

A board game, such as "Blue Marble" for example, may involve player pieces placed on a gameboard, with the game conducted according to a predefined set of rules. A board game can have users playing face to face, and can thus provide levels of engagement and user experience that are unlike those provided by computer games, which are generally played alone.

With conventional board games, however, the gameboard may be implemented by cardboard, etc. As such, there is a limit to the level of realism with which the story of the board game may be expressed, and there is also a limit to how much the content of the game can be modified or supplemented.

SUMMARY

An aspect of the invention is to provide a method and apparatus for providing a mirror-world based digital board game service that applies a virtual 3-dimensional mirror world and assembly blocks to a physical board game to increase the users' enjoyment.

To achieve the objective above, an aspect of the present invention provides a method for providing a mirror-world based digital board game service at a server that is connected over a network with a common screen device and a multiple number of mobile terminals. The method includes: transmitting at least one of map information and game story information for a board game to the common screen device; receiving game progress information from the mobile terminals, once the arrangement of a multiple number of property blocks on a gameboard is completed according to the map information and a board game is started; and transmitting response information corresponding to the game progress information to the common screen device, where the common screen device recognizes the arrangement of the property blocks and the piece blocks that move over the property blocks, and displays an image corresponding thereto and an image corresponding to the response information.

The map information can include the identifiers and the position information of the property blocks arranged on the gameboard, and the game story information can include information related to the final objective of the board game.

The common screen device can display an image corresponding to the property blocks and the piece blocks by receiving the identifiers and the position information of the property blocks and the identifiers and the position information of the piece blocks moving over the property blocks through near-field communication.

The common screen device can determine whether or not the identifiers and the position information of the property blocks arranged on the gameboard correspond to the map information, and can display the image corresponding to the property blocks if the arrangement of the property blocks agrees with the map information.

The property blocks can include at least one of a starting block, a game block, a trap block, a moving block, a selection block, a quiz block, an item block, and a finish block.

The game progress information can include at least one of digital dice manipulation result information, skip turn information, obtain item information, and event performance result information when moving to one of the plurality of property blocks, where the digital dice manipulation result information, the skip turn information, the obtain item information, and the event performance result information are executed by a board game application installed on each of the plurality of mobile terminals.

The response information can include at least one of the digital dice manipulation result information, an event for a property block to which a user's piece block is moved according to the digital dice manipulation result, and a result of performing the event.

The game progress information can be set to either a private level or a sharing level, and the response information for game progress information set to the sharing level can be transmitted to the common screen device and the multiple number of mobile terminals, while the response information for game progress information set to the private level can be transmitted only to one of the mobile terminals.

The method can further include, prior to the start of the board game, transmitting at least one of a game room list and individual user information to the common screen device and the plurality of mobile terminals, where the individual user information can include at least one of a user ID, a level, a record of wins and losses, and a number of points retained.

A board game application installed on each of the mobile terminals can output a game interface for manipulating digital dice, one of keeping, buying, selling, and exchanging an item, and at least one of attacking and defending by use of the item.

Another aspect of the present invention provides a method for providing a mirror-world based digital board game service at a common screen device that is configured to perform near-field communication with a board assembly and is connected over a network with a server. The method includes: receiving at least one of map information and game story information for a board game from the server; receiving arrangement information regarding an arrangement of a multiple number of property blocks from the board assembly; determining whether or not the arrangement of the property blocks agrees with the map information; outputting an image corresponding to the property blocks if the arrangement of the property blocks agrees with the map information; receiving response information corresponding to the game progress information of a multiple number of mobile terminals from the server, once an arrangement of the property blocks is completed and a board game is started; and displaying an image corresponding to the response information.

Yet another aspect of the present invention provides a method for providing a mirror-world based digital board game service at a mobile device that is connected over a network with a server. The method includes: transmitting game progress information corresponding to a user manipulation to the server, once an arrangement of a multiple number of property blocks is completed according to map information transmitted to a common screen device and a board game is started; and receiving response information corresponding to the game progress information from the server, where the common screen device recognizes the arrangement of the property blocks and piece blocks moving over the property blocks and displays an image corresponding thereto and an image corresponding to the response information.

Another aspect of the present invention provides a computer-readable recorded medium that tangibly embodies a program of instructions for performing one of the methods described above.

Still another aspect of the present invention provides a server apparatus for providing a mirror-world based digital board game service. The server apparatus, which is connected over a network with a common screen device and a multiple number of mobile terminals, includes: a communication module configured to transmit at least one of map information and game story information for a board game to the common screen device; and a game progress control module configured to receive game progress information from the mobile terminals and generate response information corresponding to the game progress information, once the arrangement of a multiple number of property blocks is completed according to the map information and a board game is started. Here, the communication module transmits the response information to the common screen device, and the common screen device recognizes the arrangement of the property blocks and piece blocks that move over the property blocks and displays an image corresponding thereto and an image corresponding to the response information.

Certain embodiments of the present invention allow users to play a board game with greater realism by using user terminals or an external display device, etc., for improvements in game quality, the level of engagement, the level of interactions, adaptability, and sociability.

Also, according to certain embodiments of the invention, a service may be provided which combines a physical board game with a virtual 3-dimensional game service provided through a screen, making it possible to provide a greater variety of effects related to the board game.

Additional aspects and advantages of the present invention will be set forth in part in the description which follows, and in part will be obvious from the description, or may be learned by practice of the invention.

BRIEF DESCRIPTION OF THE DRAWINGS

FIG. 6A and FIG. 6B illustrate an example of a screen showing a game room list according to an embodiment of the invention.

DETAILED DESCRIPTION

Figure 1:
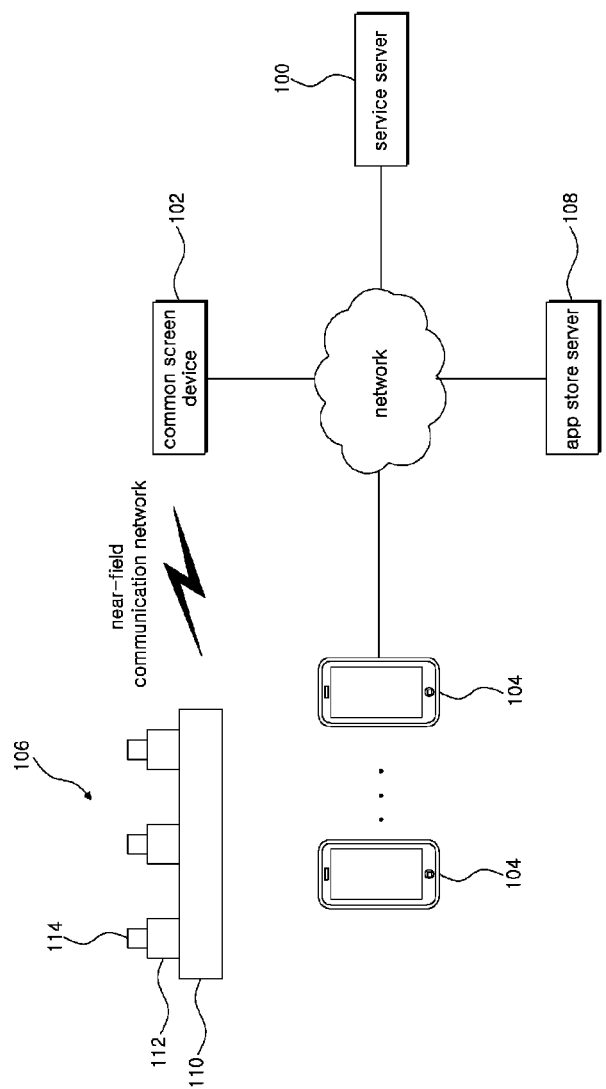
FIG. 1 illustrates a mirror-world based digital board game system according to an embodiment of the invention.

Certain embodiments of the present invention will be described below in more detail with reference to the accompanying drawings. To aid the overall understanding of the invention, like reference numerals are used to represent like elements, regardless of the figure number.

FIG. 1 illustrates a mirror-world based digital board game system according to an embodiment of the invention.

As illustrated in FIG. 1, a board game system according to an embodiment of the invention can include a service server 100, a common screen device 102, mobile terminals 104, and a board assembly 106.

The service server 100, common screen device 102, and mobile terminals 104 according to an embodiment of the invention may be connected over a network. Here, the network can include the Internet or a mobile communication network, or even a near-field communication network such as Bluetooth and WiFi.

The common screen device 102 may be a device that interworks with the service server 100 and the board assembly 106 to display images related to a board game that are to be seen by multiple users simultaneously. In one example, the common screen device 102 can be a tablet PC, but the invention is not thus limited, and the common screen device 102 can be any device that is capable of accessing a network and has a screen of a particular size.

Also, the common screen device 102 can be equipped with a touch screen and can respond a user's touch manipulation.

The common screen device 102 and the board assembly 106 according to an embodiment of the invention can be connected by a near-field communication network. For example, the common screen device 102 and the board assembly 106 can be connected by Bluetooth pairing, but the invention is not limited thus.

With a mirror-world based digital board game service according to an embodiment of the invention, the game actions of multiple users on the board assembly 106, which exists in real physical space, may be intertwined with a virtual space through the service server 100, common screen device 102, and mobile terminals 104.

As illustrated in FIG. 1, a board assembly 106 according to an embodiment of the invention can include a gameboard 110, and a multiple number of property blocks 112 and piece blocks 114.

Prior to the start of a board game according to an embodiment of the invention, the service server 100 may transmit map information and game story information for a board game to the common screen device 102.

Here, the map information may be information for arranging the multiple property blocks in physical space, and as more specific examples, can include the identifiers and position information of each of the multiple property blocks 112 that need to be arranged on the gameboard 110.

Here, the property blocks can be classified into starting blocks, game blocks, trap blocks, moving blocks, selection blocks, quiz blocks, item blocks, finish blocks, etc., according to their preset functions or associated events.

Figure 2:
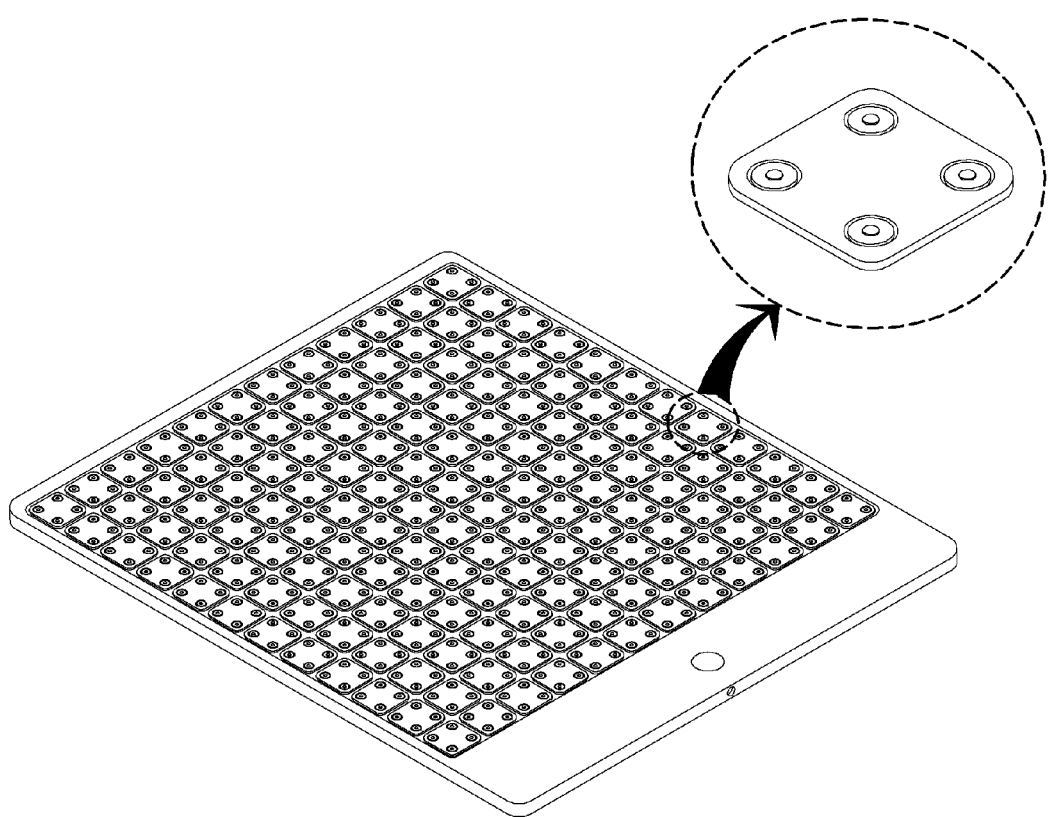
FIG. 2 illustrates the detailed structure of a gameboard according to an embodiment of the invention.

FIG. 2 illustrates the detailed structure of a gameboard according to an embodiment of the invention, and as illustrated in FIG. 2, a gameboard 110 according to an embodiment of the invention can have a structure of multiple grids, with unique coordinate values set beforehand for each individual grid.

The recognition of the property blocks 112 and piece blocks 114 on the gameboard 110 will be described later on.

The map information sent by the service server 100 to the common screen device 102 can include the coordinate values of each of the multiple property blocks on the gameboard 110, and the common screen device 102 may use the coordinate values to display an image of the multiple property blocks. Here, the common screen device 102 can display a gameboard image and an image of each property block arranged on the gameboard.

Users participating in the game can refer to the image of the multiple property blocks displayed via the common screen device 102 and arrange the property blocks on the gameboard 110 accordingly.

In an embodiment of the invention, the property blocks can be differentiated by unique colors, and the common screen device 102 can display the gameboard image with the colors of the property blocks that are to be arranged on the respective grids of the gameboard, to help the users to arrange the property blocks correctly.

According to another embodiment of the invention, the gameboard 110 can communicate with the server 100 directly, without going through the common screen.

Along with the map information, the service server 100 can transmit game story information to the common screen device 102.

Here, the game story information can include an image of a completed arrangement of property blocks (a board game image), character descriptions, event descriptions, event information for each property block, event performance information, item information, item acquisition conditions, information on the final objective, etc.

According to an embodiment of the invention, the gameboard 110 may be capable of recognizing the property blocks arranged in the grids and may transmit the identifiers and position information (coordinate information) of the property blocks to the common screen device 102 by way of a near-field communication network.

Also, during a board game, the gameboard 110 may recognize the piece blocks 114, which may move over the property blocks, and may transmit the relevant information to the common screen device 102, allowing the common screen device 102 to display a virtual image corresponding to the movement of the piece blocks 114.

The recognition of the property blocks 112 and piece blocks 114 on the gameboard 110 can be performed using any of a variety of methods, such as a contact point method using contact pins, methods using specific resistance values, methods using sensors and ID's, etc.

As such information on the property blocks is transmitted, the common screen device 102 can determine whether or not the property blocks have been correctly arranged according to the map information, and if the multiple property blocks have been correctly arranged, can allow the board game to begin.

Conducting the board game according to an embodiment of the invention may be performed through the mobile terminals 104 of the individual users. To this end, after the arrangement of the property blocks is completed as described above, each user may use his/her mobile terminal 104 to access the service server 100, proceed through a certification process, and receive user information.

Here, the user information can include a user ID, ranking, record of wins and losses, points acquired, etc.

The common screen device 102 and mobile terminals 104 according to an embodiment of the invention may be installed beforehand with an application for a board game service according to an embodiment of the invention, and when the application is executed, can access the service server 100 to send and receive certain information.

When a connection is configured between the common screen device 102 and the gameboard 110, the arranging of the property blocks is completed, and the connection configuration between the service server 100, common screen device 102, and mobile terminals 104 is completed, the board game may begin.

After configuring the connections as described above, additional process may be necessary for generating game rooms, selecting characters, determining play order, checking the final objective, etc., in order to start the board game.

A board game may involve the movement of each character (piece block) based on a dice roll, and when a piece block is to be moved according to a dice manipulation, a user may move the piece block 114 over the property blocks.

As described above, the gameboard 110 can recognize the piece blocks 114 in a similar manner as for the property blocks, and when a piece block 114 is moved according to a dice manipulation, the identifier and position information of the piece block 114 may be transmitted to the common screen device 102.

In one embodiment of the invention, the dice manipulation can be performed through the mobile terminals 104.

An application installed on the mobile terminal 104 can output an interface for a digital dice manipulation, and when the user inputs a manipulation such as by shaking or touching the mobile terminal 104, a manipulation result for one or more digital dice may be outputted.

Information regarding the game's progress, i.e. game progress information, may be transmitted to the service server 100, and the service server 100 may transmit response information, which corresponds to the game progress information, to the common screen device 102.

Here, the response information can include at least one of digital dice manipulation result information (the final number), an event for the property block to which a piece will be moved in accordance with the digital dice manipulation result, and event performance result information.

The common screen device 102 may display an image corresponding to the response information.

For example, the common screen device 102 may show each user's character and the overall map in an initial state. Then, when the above-described response information is received, the common screen device 102 may show a number and may display an event which the user has to perform, as well as the result of performing the event (success/failure).

In playing the board game, performing an event can be achieved according to a manipulation on each user's mobile terminal 104.

That is, after the digital dice manipulation, the application installed on the mobile terminal 104 can output event information regarding an event that the user has to perform, and the result of the user's manipulation (event performance result) may be transmitted to the service server 100.

The event information, regarding an event that the user has to perform, can be transmitted from the service server 100 to the mobile terminal 104.

In an embodiment of the invention, an event can be related to a game, a quiz, an item, a hint, etc.

As the game progresses as described above, the user who completes the final objective can be determined as the winner.

Referring again to FIG. 1, a game system according to an embodiment of the invention can include an app store server 108 that is connected over a network with the service server 100 or the mobile terminals 104.

An app store server 108 according to an embodiment of the invention may be a server that allows a user to obtain or purchase items, etc., that can be used to the user's advantage during the game for free or for a fee. The items provided at the app store server 108 can be provided at the request of a mobile terminal 104 during or prior to a game and can be stored at the mobile terminal 104.

In an embodiment of the invention, a game in physical space can be interworked with network devices such as the service server 100, common screen device 102, and mobile terminals 104 by means of the board assembly 106, and can thus be reflected in a virtual space, for increased enjoyment on the part of the users.

A board game according to an embodiment of the invention is described below in more detail with reference to the accompanying drawings.

Figure 3:
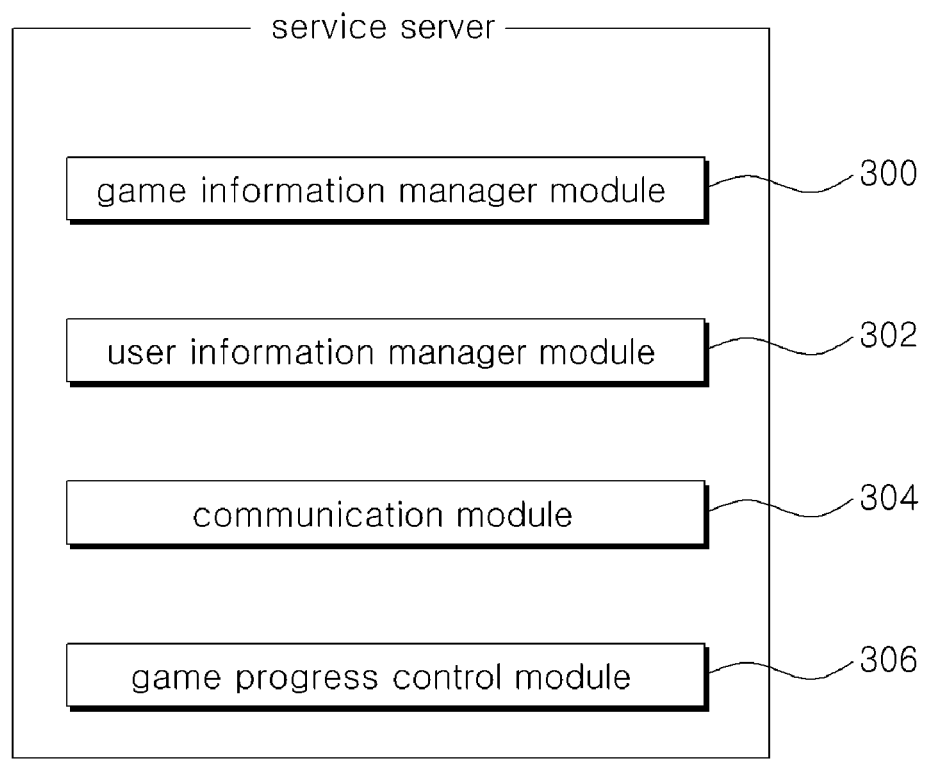
FIG. 3 illustrates the detailed composition of a service server according to an embodiment of the invention.

FIG. 3 illustrates the detailed composition of a service server according to an embodiment of the invention.

As illustrated in FIG. 3, a service server 100 according to an embodiment of the invention can include a game information manager module 300, a user information manager module 302, a communication module 304, and a game progress control module 306.

The game information manager module 300 may store and manage the map information and game story information for a multiple number of games.

In an embodiment of the invention, the map can be different according to the type of board game chosen by the users, and likewise, the story for each map (board game) can be different. The game story information and the map information for each board game can be associated with each other when they are stored.

The user information manager module 302 may store and manage user information, regarding users who have subscribed as members.

The user information can include an ID, password, ranking, number of wins, points acquired, etc.

The user ID and password may be used to certify a user who has connected through the common screen device 102 or a mobile terminal 104.

Prior to the start of a board game, the communication module 304 may receive a request for map information from the common screen device 102, and the requested map information may be transmitted to the common screen device 102.

At this time, the communication module 304 may transmit the game story information which corresponds to the requested map information to the common screen device 102.

Here, the game story information transmitted to the common screen device 102 can include only the information on the background and final objective of the board game.

After the map information is represented on the common screen device 102 and the users' arrangement of the property blocks based on the map information is completed, the communication module 304 may receive game progress information from the mobile terminal 104 of each of the users participating in the board game, and may transmit response information, which corresponds to the game progress information, to the common screen device 102.

The game progress control module 306 may control the procedures for creating game rooms, certifying entry into a game room, and starting a board game (for example, selecting a character and determining the play order) with the common screen device 102 or the mobile terminals 104 at the beginning of the board game, as well as the procedures for generating or extracting response information in correspondence to the game progress information received from the mobile terminals 104 during the board game.

Here, the game progress information can include at least one of digital dice manipulation result information, skip turn information, obtain item information, and event performance result information when moving to one of the multiple number of property blocks.

Also, the response information can include at least one of the digital dice manipulation result information, an event for a property block to which a user's piece block is moved according to the digital dice manipulation result, and a result of performing the event.

Such response information can be transmitted not only to the common screen device 102 but also to the mobile terminal 104 of each user.

In an embodiment of the invention, a set of game progress information can include a setting for a level regarding whether or not it is to be opened to other users (i.e. a private level or a sharing level). If the game progress information is set to the sharing level, then the response information corresponding to this game progress information may be transmitted to the common screen device 102 or the mobile terminals 104.

Conversely, the response information for a set of game progress information that is set to the private level can be transmitted only to one of the mobile terminals.

The determining of where a set of response information will be received according to the level of openness can be performed at the game progress control module 306.

For example, if a set of game progress information is for the results of a digital dice manipulation, then the number for the digital dice manipulation result can be transmitted to the common screen device 102.

If a set of game progress information is for using a secret card held by a user and should not be opened to other users, then the response information for the results of using the secret card can be transmitted only to the mobile terminal 104 of the user who used the secret card.

Below, the detailed composition of the common screen device and the mobile terminals will be described with reference to the accompanying drawings.

Figure 4:
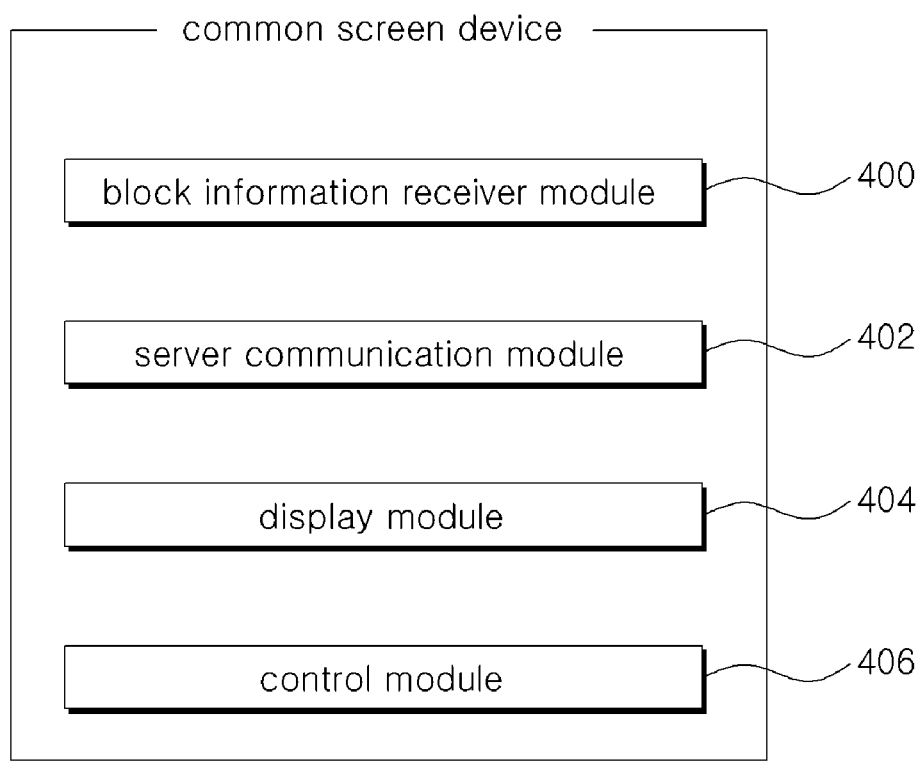
FIG. 4 illustrates the modular composition of an application installed on a common screen device according to an embodiment of the invention.

FIG. 4 illustrates the modular composition of an application installed on a common screen device according to an embodiment of the invention.

As illustrated in FIG. 4, a common screen device 102 according to an embodiment of the invention can include a block information receiver module 400, a server communication module 402, a display module 404, and a control module 406.

The block information receiver module 400 may receive property block arrangement information and piece block arrangement information from the board assembly 106, for example by near-field communication.

In an embodiment of the invention, the near-field communication can be implemented by a Bluetooth method.

When the near-field communication is activated, the common screen device 102 may search for devices within a near distance with which communication is possible, and if the board assembly 106 is found as described above, then a connection may be established. Afterwards, the block information receiver module 400 may receive arrangement information, such as the identifiers and position information of the property blocks and the identifiers and position information of the piece blocks, from the gameboard 110.

The server communication module 402 may transmit certain requests to, and receive responses to the requests from, the service server 100.

For starting a board game, the server communication module 402 may request and receive a set of map information from the service server 100. Also, during a board game, the server communication module 402 may receive response information corresponding to the actions of the respective users from the service server 100, and the display module 404 may display the response information.

The display module 404 can display the response information not only as still images but also as video images.

Also, the display module 404 can display the map information received from the service server 100, and when the users arrange the property blocks on the gameboard 110, can display the arranged state of the property blocks as well as information regarding whether or not the arrangement of the property blocks is correct.

Here, the control module 406 can determine whether or not the property blocks are being arranged correctly by referencing the map information. This can be determined based on whether or not a newly arranged property block agrees with the map information.

If there is an error in the arrangement of the property blocks, the control module 406 can provide the control such that an error message is displayed.

Also, the control module 406 may display an image corresponding to the multiple property blocks if the arrangement of all of the property blocks agrees with the map information.

Here, the control module 406 may reflect the arrangement of the property blocks in real time as output on the screen.

The image corresponding to the multiple property blocks can represent virtual paths for a board game.

The display module 404 of the common screen device 102 according to an embodiment of the invention can output an interface for arranging the property blocks or for creating a game room.

Figure 5:
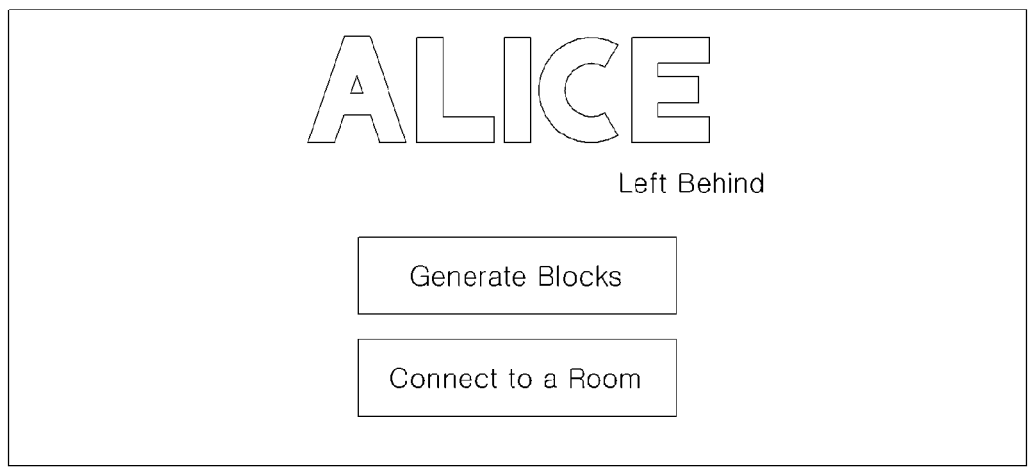
FIG. 5 illustrates an example of a screen shown initially on a common screen device according to an embodiment of the invention.

FIG. 5 illustrates an example of a screen shown initially on a common screen device according to an embodiment of the invention.

The screen shown in FIG. 5 can also be shown simultaneously on the mobile terminals.

As illustrated in FIG. 5, the initial screen can include a menu for generating blocks and a menu for connecting to a room.

The block generation menu may be for the arranging of property blocks and can be activated on the common screen device 102 only. When a user selects the block generation menu, the map information received from the service server 100 as described above can be displayed, and information can be displayed that allows users to check whether or not the property blocks are being correctly arranged.

However, since the mobile terminals 104 are for individual users, the block generation menu can be displayed in a deactivated state.

After the arrangement of the property blocks is complete, the user can select the room connect menu on the user's own mobile terminal 104 to enter a game room that is open.

As illustrated in FIG. 6A, when the room connect menu is selected, a list of one or more open game rooms can be shown on the common screen device 102 or on the mobile terminal 104, and the user can enter one of the game rooms.

In a preferred embodiment, entering a game room can require a password.

The password to a game room can be set beforehand by the room's host and can be stored at the service server 100, and the service server 100 may permit entry to the game room if a password for a particular game room transmitted from the mobile terminals 104 agrees with the preset password.

A board game based on an embodiment of the invention may generally be played by multiple users who have gathered in a single space, and as such, a password set by the room host can be easily shared with the other users, while a third party who is not in the same space can be prevented from entering the game room.

However, this is to protect users who are actually participating in the game, and if a user wishes to enter a game room simply for the purpose of observation (e.g. in a viewer mode), then the user may not be required to enter a password.

When all of the users participating in the board game have entered the game room, an interface for starting the board game can be outputted on the host's mobile terminal 104 as in FIG. 6B.

Figure 7:
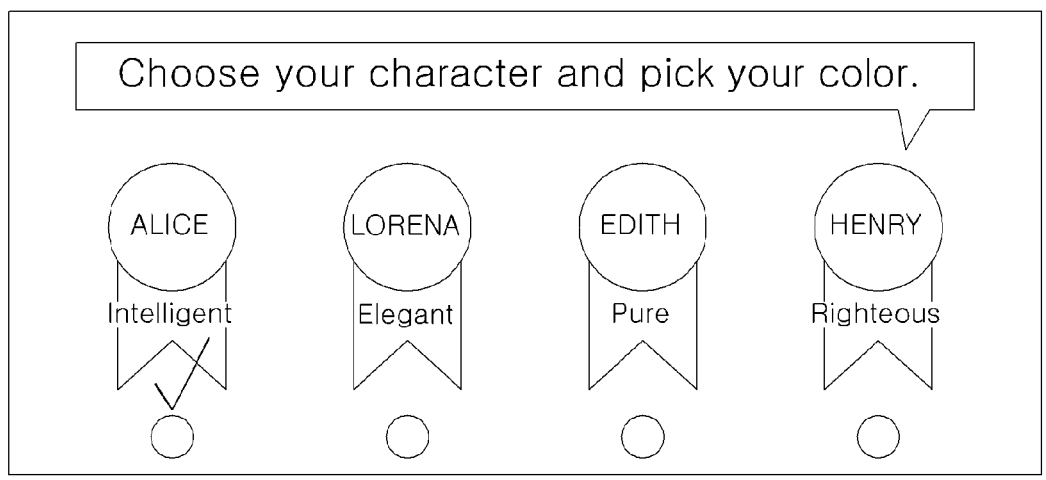
FIG. 7 illustrates an example of an interface for selecting characters according to an embodiment of the invention.

When the room host selects the start menu, a character selection interface such as that shown in FIG. 7 may be outputted on the common screen device 102 and the mobile terminal 104 of each user.

Such outputting of a game interface can be achieved by an application installed on the mobile terminals 104, where the application can provide the control such that certain information is received from the service server 100 and the required game interface is outputted.

A character selection interface according to an embodiment of the invention may show the names and features of a multiple number of characters, and when one is selected by a user, the character can be changed to a deactivated state.

The character selection information at a mobile terminal 104 may be transmitted to the service server 100, and the service server 100 may transmit deactivate control messages for characters that have been selected already to the other mobile terminals 104 so that the other users may not make the same selection.

Figure 8:
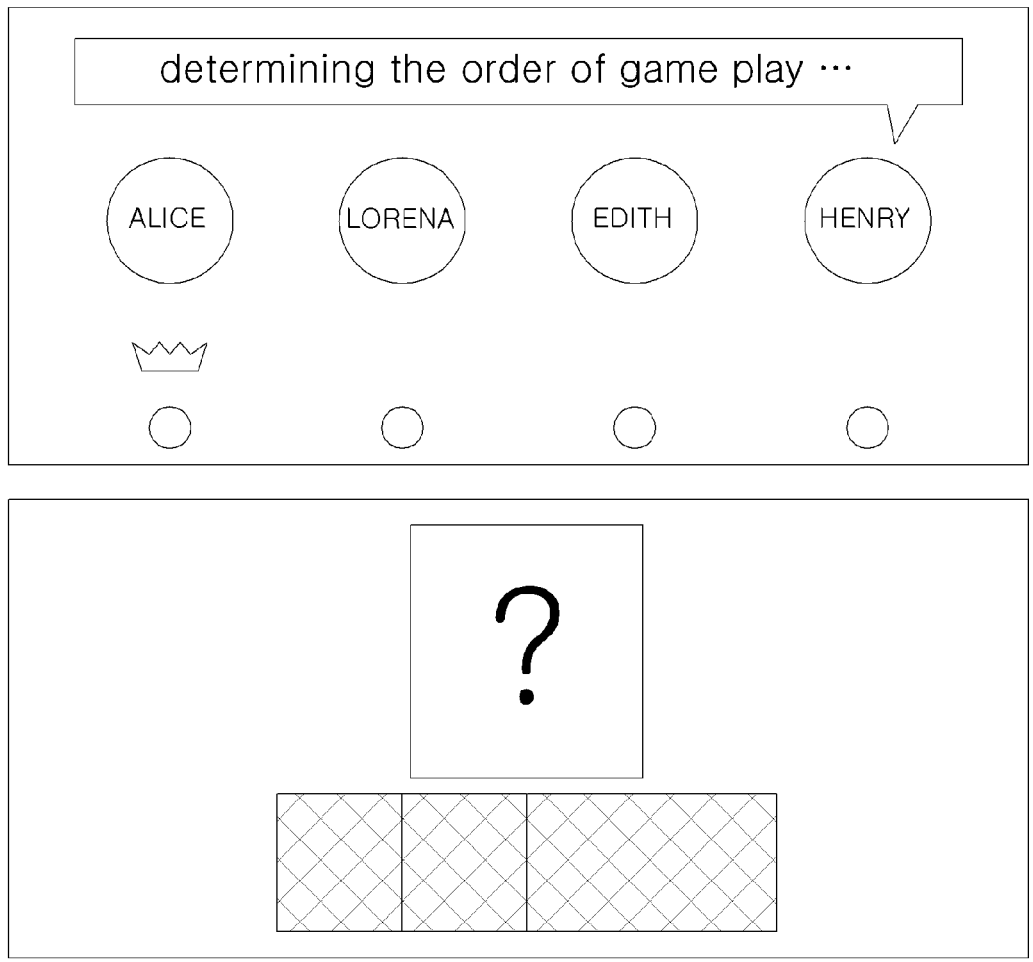
FIG. 8 illustrates an example of an interface for determining play order according to an embodiment of the invention.
Figure 9:
FIG. 9 illustrates an example of a screen showing the final objective according to an embodiment of the invention.

Afterwards, an interface for determining the order of game play may be outputted on the mobile terminals 104 as in FIG. 8, the final objective may be displayed as in FIG. 9, and the board game may begin.

Figure 10:
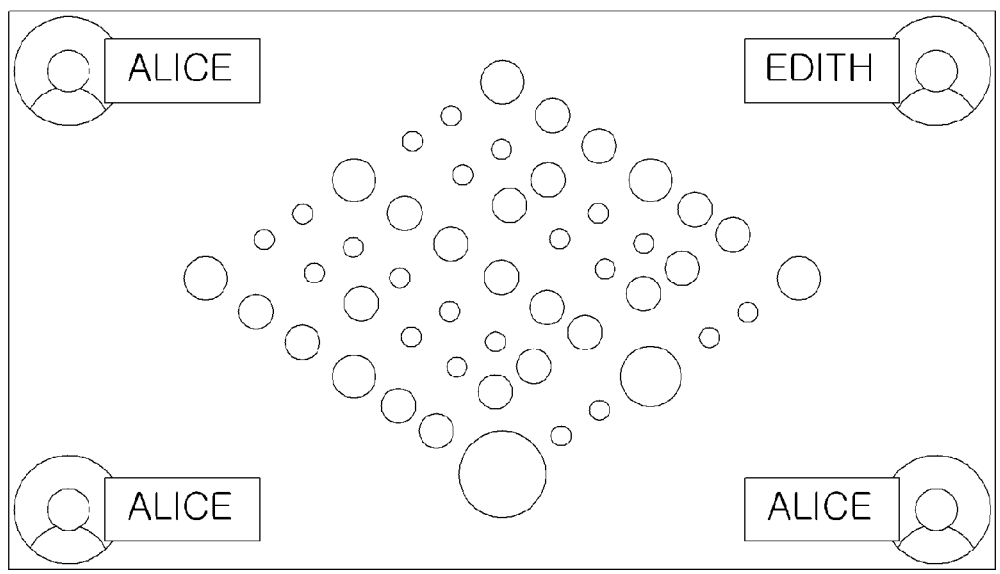
FIG. 10 illustrates an example of a screen displayed on a common screen device at the start of a board game according to an embodiment of the invention.

FIG. 10 illustrates an example of a screen displayed on a common screen device 102 at the start of a board game according to an embodiment of the invention.

As illustrated in FIG. 10, the multiple property blocks can be displayed as a corresponding image, while the character selected by each user and additional information can be shown in certain areas of the screen.

FIG. 11 through FIG. 15 illustrate examples of a game interface shown on a mobile terminal during a board game according to an embodiment of the invention.

Figure 11:
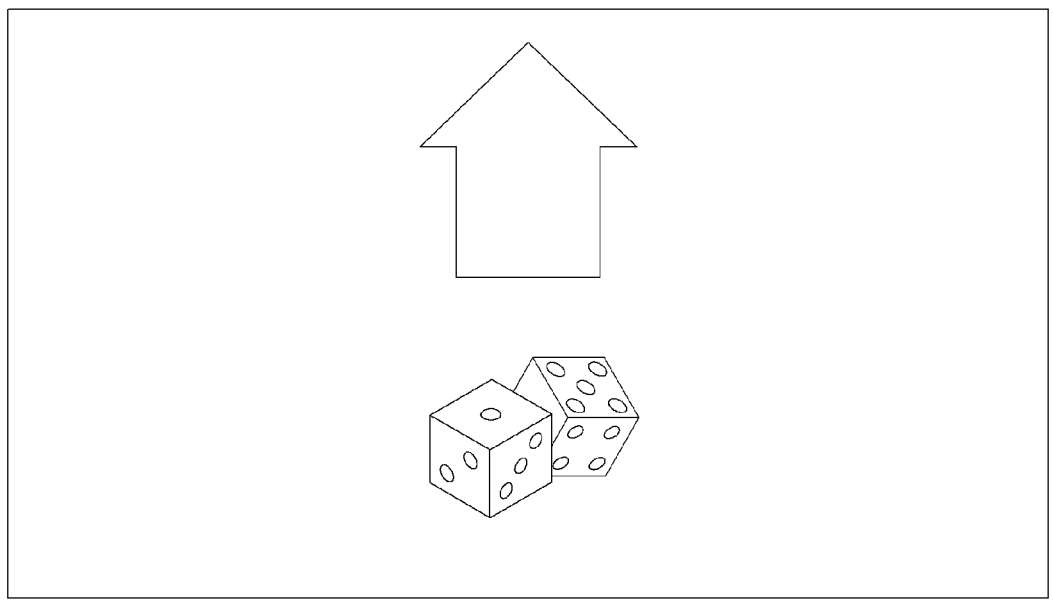
FIG. 11, FIG. 12, FIG. 13, FIG. 14, and FIG. 15 illustrate examples of a game interface shown on a mobile terminal during a board game according to an embodiment of the invention.

As illustrated in FIG. 11, a user at his/her turn can manipulate digital dice through the mobile terminal 104, and the result may be shown on the common screen device 102.

Here, the digital dice can be manipulated when the user performs an action of pushing up on the touch screen in the direction of the arrow.

Figure 12:
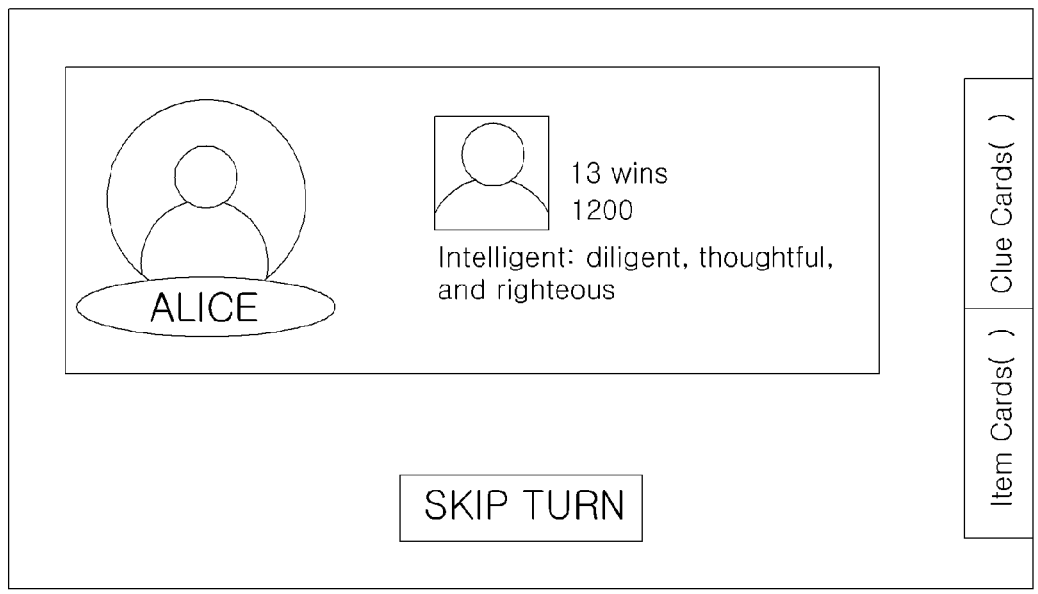

Also, when the dice manipulation is completed, an interface that includes a skip turn menu may be outputted as in FIG. 12, and when the skip turn menu is selected, the game can proceed to the next user.

Figure 13:
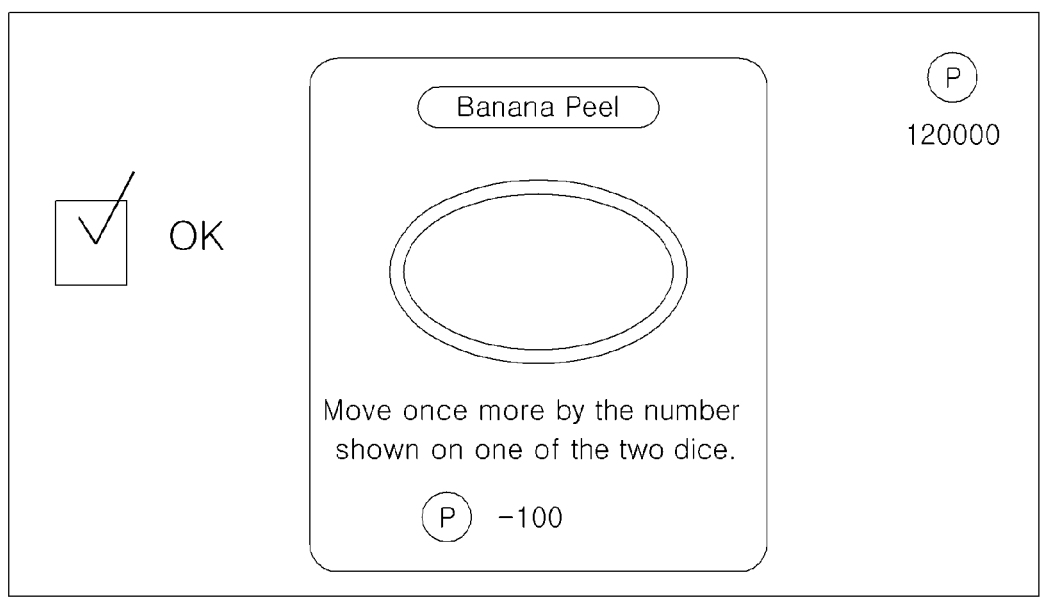

If an event occurs according to the digital dice manipulation, then an event interface can be outputted, as illustrated in FIG. 13.

Figure 14:
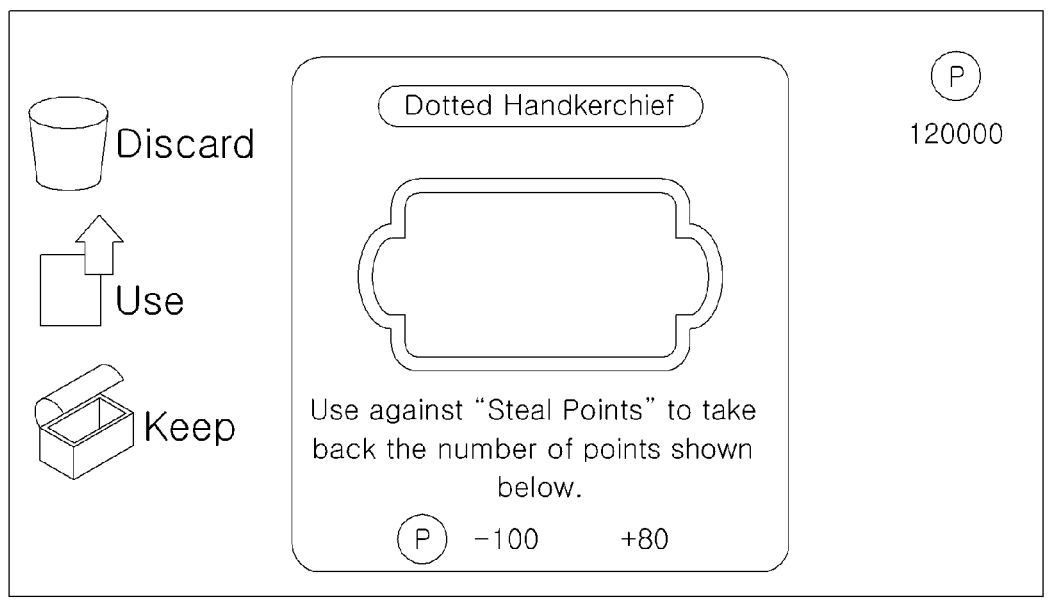

If the event according to the digital dice manipulation is related to an item, an item interface can be outputted, such as that shown in FIG. 14.

An item can be used, kept, or if not needed, discarded. A menu for selecting one of these options may be shown on the interface.

Figure 15:
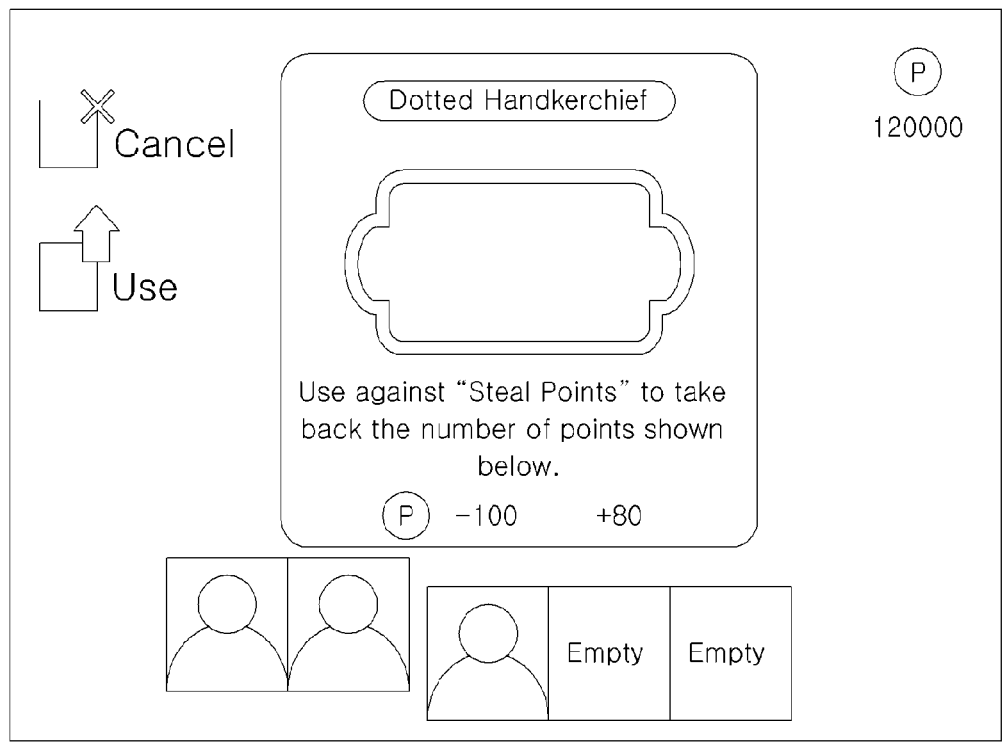

If a selection is made to keep an item, an inventory interface may be outputted as in FIG. 15.

According to an embodiment of the invention, the user can keep one or more cards or items and can attack or defend as the event permits. Such game progress information may be transmitted to the service server 100.

The service server 100 may transmit the results of an attack or a defend, i.e. response information, to the common screen device 102 or the mobile terminal 104.

As described above, when the digital dice are manipulated through the mobile terminal 104 and a piece block 114 is moved according to the number indicated by the dice, then an event may occur at the corresponding position.

Thus, a board game according to an embodiment of the invention may be played in connection with a board assembly 106 present in physical space. A more detailed description is provided below of a board assembly according to an embodiment of the invention.

As described above, a board assembly 106 according to an embodiment of the invention can be composed of a gameboard 110, property blocks 112, and piece blocks 114.

As illustrated in FIG. 2, a gameboard 110 according to an embodiment of the invention can be structured with multiple grids, each having unique coordinate values, and can be made to communicate with the common screen device 102 by near-field communication.

Figure 16:
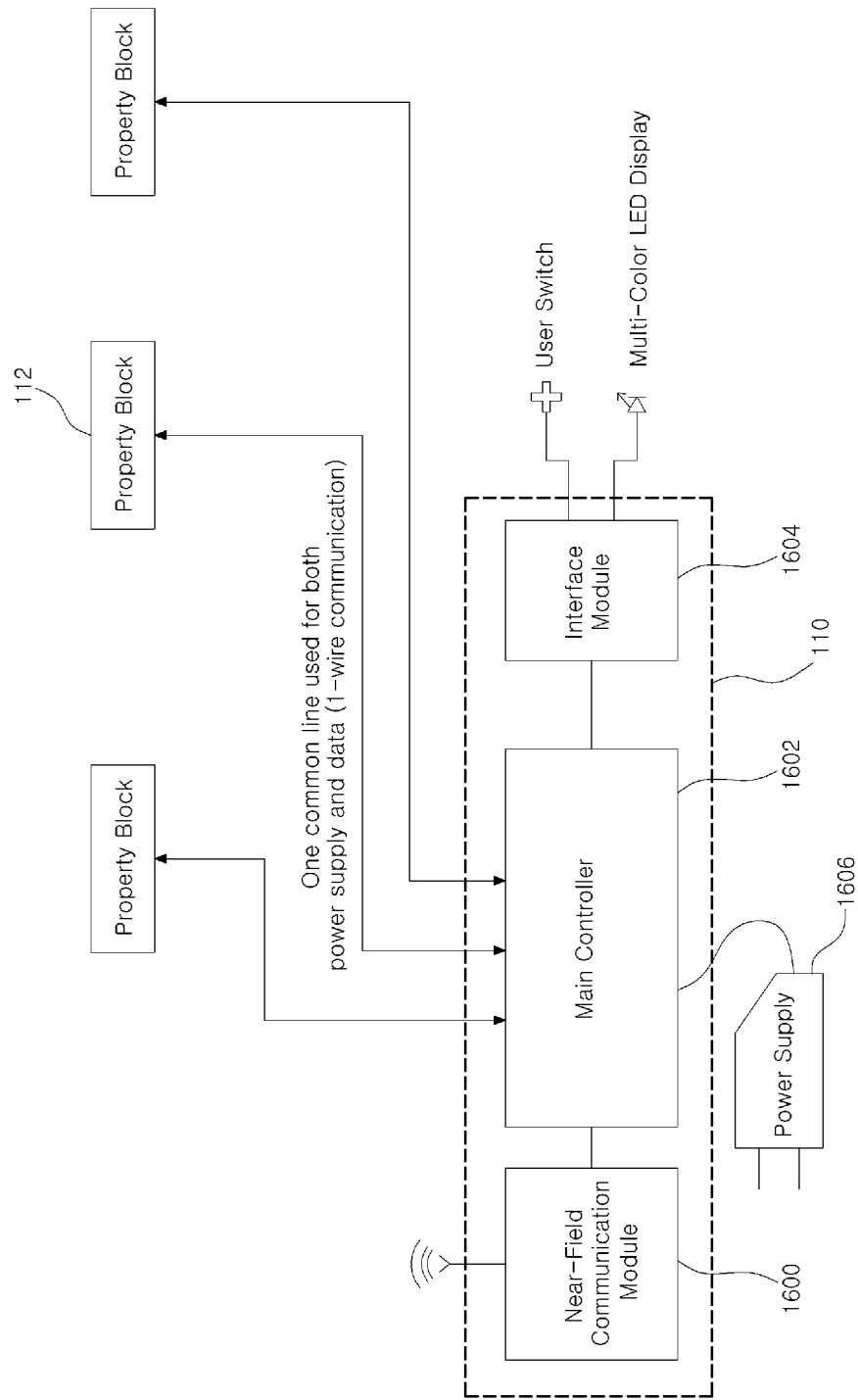
FIG. 16 illustrates the detailed composition of a board assembly according to an embodiment of the invention.

FIG. 16 illustrates the detailed composition of a board assembly according to an embodiment of the invention.

As illustrated in FIG. 16, a gameboard 110 according to an embodiment can include a near-field communication module 1600, a main controller 1602, an interface module 1604, and a power supply module 1606.

The near-field communication module 1600 may communicate with the common screen device 102 according to a near-field communication protocol, and may transmit information related to the positions of the property blocks and piece blocks to the common screen device 102.

When the property blocks are arranged on the gameboard 110, the main controller 1602 may provide control to supply power to the property blocks 112 and read the identifiers stored in the memory 1804 of the property blocks 112.

As illustrated in FIG. 16, the main controller 1602 and the property blocks 112 of the gameboard 110 can be connected by a 1-wire communication method that uses a common line for both power supply and data.

When the main controller 1602 detects an arrangement of the property blocks, the near-field communication module 1600 may transmit information on the arranged property blocks to the common screen device 102.

According to an embodiment of the invention, the piece blocks 114 can be electrically connected with and can exchange data with the main controller 1602 through the property blocks 112.

If a piece block 114 is placed on a property block, the main controller 1602 may supply power to the piece block 114 and may read the identifier stored in the memory (not shown) of the piece block 114.

While the descriptions above refer to the property blocks and piece blocks being recognized by use of information stored in the memory, it is possible to recognize the property blocks and piece blocks through various methods such as those using Hall sensors, resistivity sensors, etc.

The interface module 1604 may be connected with a power button or an LED control switch, and when the user turns the switch on, power may be supplied to the main controller 1602 of the gameboard 110 and block recognition may be performed.

Also, the LED control switch can be connected with one or more LED's, so that the user may identify whether or not the power is turned on for the gameboard 110 and whether or not it is currently performing block recognition (scan).

Figure 17:
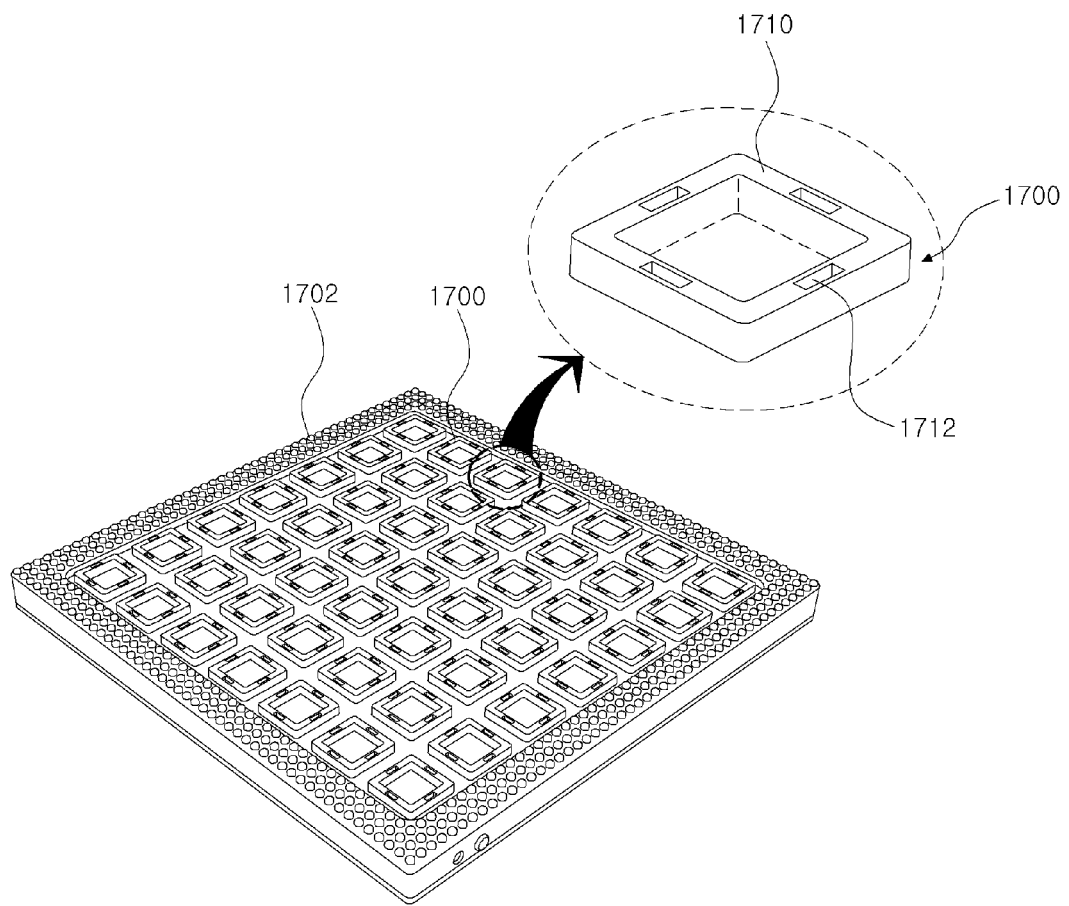
FIG. 17 illustrates the structure of a gameboard according to an embodiment of the invention.

FIG. 17 illustrates the structure of a gameboard according to an embodiment of the invention.

As illustrated in FIG. 17, a gameboard 110 according to an embodiment of the invention can include a property block arrangement part 1700 and a decorative block arrangement part 1702.

The property block arrangement part 1700 may be the area in which to arrange the property blocks and can be divided into multiple grids. A property block arrangement part 1700 according to an embodiment of the invention can have the property blocks fitted thereon and can be structured in a way that allows connections to the property blocks.

To be more specific, a property block arrangement part 1700 according to an embodiment of the invention may include protrusion parts 1710 that protrude a certain length upward from the bottom of the gameboard 110.

The decorative block arrangement part 1702 may include multiple protrusions and may be formed along the perimeter of the gameboard.

In one embodiment, the decorative block arrangement part 1702 can accommodate decorations by way of existing blocks (e.g. LEGO blocks). Along with the property blocks, the users can arrange decorative blocks to form certain structures, etc., for increased enjoyment of the game.

The gameboard 110 according to an embodiment of the invention can additionally include a gameboard connection part (not shown), with which a multiple number of gameboards 110 can be connected together to increase the size of the gameboard 110.

Figure 18A:
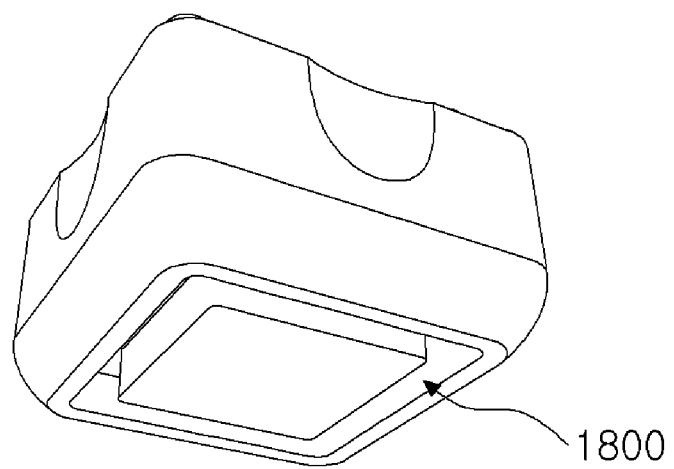
FIG. 18A, FIG. 18B, and FIG. 18C illustrate the structure of a property block according to an embodiment of the invention.
Figure 18B:
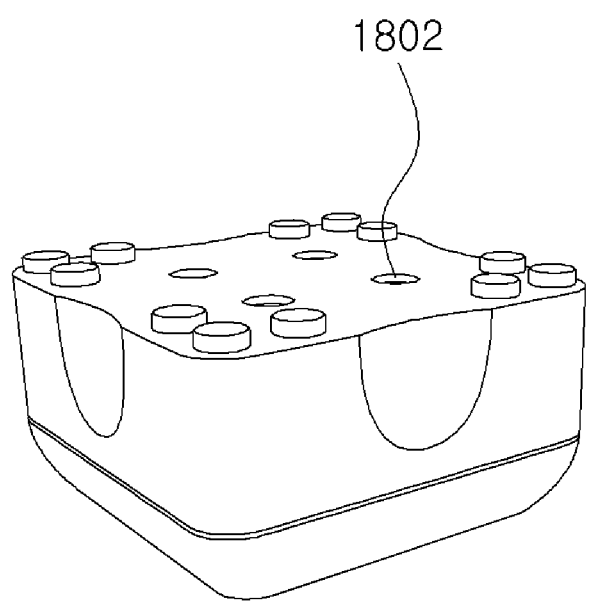
Figure 18C:
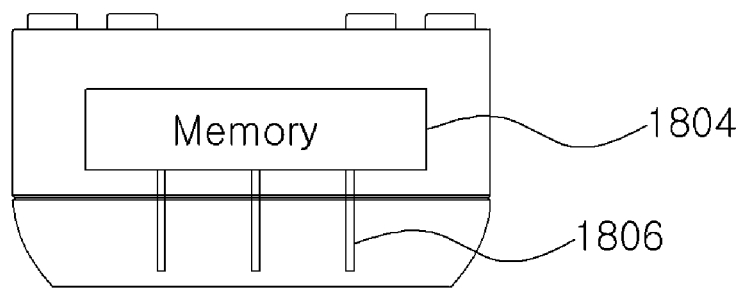

FIG. 18A, FIG. 18B, and FIG. 18C illustrate the structure of a property block according to an embodiment of the invention.

As illustrated in FIG. 18A, a mating part 1800 may be formed on a lower portion of a property block 112 according to an embodiment of the invention.

The users can arrange the property blocks 112 by fitting the mating parts 1800 of the property blocks 112 onto the protrusion parts 1710 of the gameboard 110.

According to an embodiment of the invention, the gameboard 110 and the property blocks 112 can be connected by way of a contact method using contact pins 1806.

For this, a contact pin 1806 that extends from the memory 1804 of a property block can be formed in the space inside the mating part 1800 of the property block 112.

In a corresponding manner, a connector 1712 that couples with the contact pin 1806 may be formed in a particular area of the protrusion part 1710.

According to an embodiment of the invention, in cases where the property blocks 112 have a quadrilateral shape, one or more contact pins 1806 can be provided at the middle of the four sides, and connectors 1712 can be provided on the protrusion part 1710 in corresponding positions.

Thus, the gameboard 110 and the property blocks 112 can be electrically connected regardless of the orientation of the property block on the property block arrangement part 1700.

Also, the sharp contact pins 1806 can be housed within the mating part 1800 to prevent safety hazards for children.

On an upper portion of a property block according to an embodiment of the invention, one or more piece block holding parts 1802 may be formed.

Figure 19:
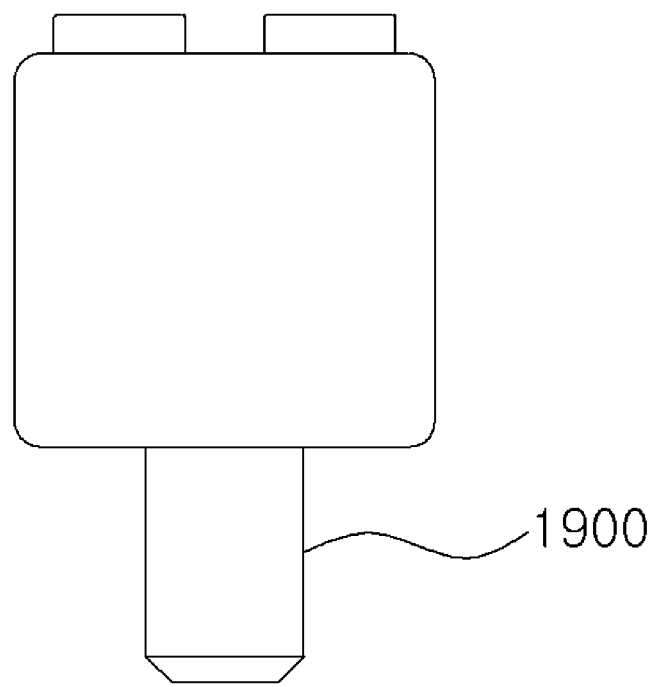
FIG. 19 illustrates the structure of a piece block according to an embodiment of the invention.

As illustrated in FIG. 19, a mating part 1900 may be formed on a lower portion of a piece block 114 according to an embodiment of the invention, and as the mating part 1900 of a piece block 114 is fitted into the piece block holding part 1802 of a property block 112, the piece block 114 can be electrically connected with the gameboard 110 by way of the property block 112.

In an embodiment of the invention, a multiple number of piece block holding parts 1802 can be provided, so that multiple piece blocks 114 can be positioned on one property block 112.

When a certain piece block 114 is fitted onto a property block 112, the gameboard 110 can recognize the identifier and position of the piece block through the electrical connection, and may transmit this information to the common screen device 102.

If a piece block is placed on a property block while another piece block is already positioned on the property blocks, then a selective recognition procedure can be performed only for the piece block that triggers an electrical change.

Thus, the gameboard 110 may recognize the property blocks 112 and the piece blocks 114 and transmit their information to the common screen device 102, and in this way, actions in physical space can be represented in a virtual space through the common screen device 102.

Figure 20:
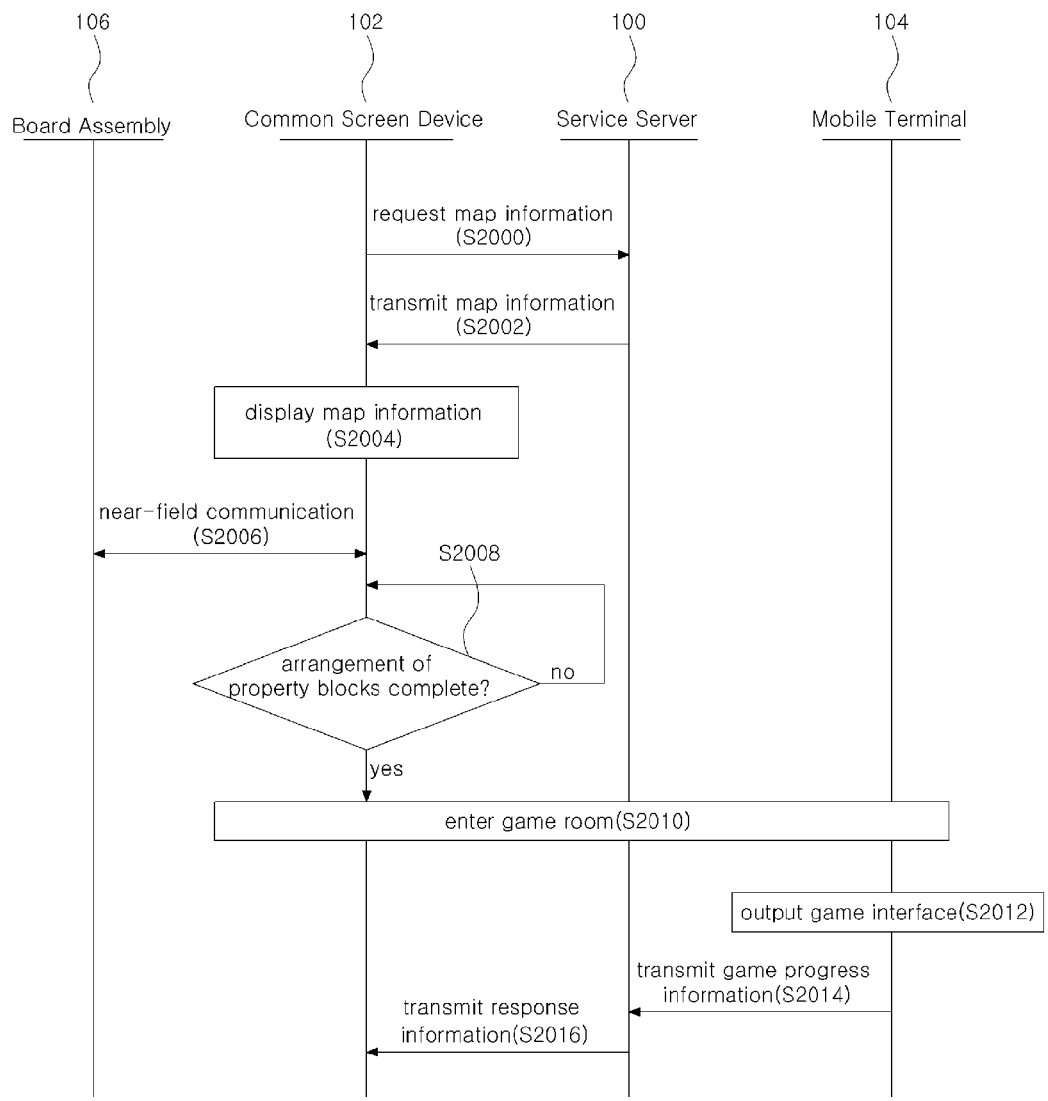
FIG. 20 is a flow diagram for providing a board game service according to an embodiment of the invention.

FIG. 20 is a flow diagram for providing a board game service according to an embodiment of the invention.

Referring to FIG. 20, the common screen device 102 may request map information from the service server 100 (operation 2000), and the service server 100 may transmit the requested map information and its corresponding game story information to the common screen device 102 (operation 2002).

The common screen device 102 may display the map information (operation 2004), and may establish a connection with the board assembly 106 by near-field communication (operation 2006).

Operation 2006 can also be performed before operations 2000 to 2004 described above.

By way of the near-field communication with the board assembly 106, the common screen device 102 may determine whether or not the arrangement of the property blocks is complete (operation 2008), and if the arrangement of the property blocks is complete, the common screen device 102, mobile terminals 104, and service server 100 may be interworked to enable the users to enter a game room (operation 2010).

After the entry into a game room is completed, a game interface may be outputted on the mobile terminals (operation 2012) for manipulating digital dice, processing events, etc., according to the order of game play of the users, and the mobile terminals 104 may transmit the digital dice manipulation results and their corresponding game progress information to the service server 100 (operation 2014).

Afterwards, the service server 100 may transmit the response information, which corresponds to the game progress information, to the mobile terminals 104 or the common screen device 102 (operation 2016).

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed for illustrative purposes. Those having ordinary skill in the field of art to which the present invention pertains would understand that various modifications, alterations, and additions can be made without departing from the spirit and scope of the present invention and that such modifications, alterations, and additions are encompassed by the scope of claims below.

What is claimed is:

1. A method for providing a minor-world based digital board game realized by a plurality of independently operating components including a server, a common screen device, a plurality of mobile terminals, and a board assembly including a physical gameboard the method comprising:
   transmitting, from the server, at least one of map information and game story information for the board game to the common screen device, the server being connected over a network with the common screen device and the plurality of mobile terminals;
   receiving, at the server, game progress information from the plurality of mobile terminals, once an arrangement of a plurality of property blocks on the gameboard is completed according to the map information and the board game is started; and
   transmitting, from the server, response information corresponding to the game progress information to the common screen device,
   wherein the common screen device performs near-field communication with the board assembly to recognize an arrangement of the plurality of property blocks and piece blocks placed over the plurality of property blocks on the gameboard and displays an image corresponding thereto and an image corresponding to the response information.

2. The method of claim 1, wherein the map information comprises identifiers and position information of the plurality of property blocks arranged on the gameboard, and the game story information comprises information related to a final objective of the board game.

3. The method of claim 2, wherein the common screen device displays an image corresponding to the plurality of property blocks and the piece blocks by receiving the identifiers and the position information of the plurality of property blocks and identifiers and position information of the piece blocks moving over the plurality of property blocks through near-field communication.

4. The method of claim 3, wherein the common screen device performs near-field communication with the board assembly to determine whether or not the identifiers and the position information of the plurality of property blocks arranged on the gameboard correspond to the map information, and displays the image corresponding to the plurality of property blocks if the arrangement of the plurality of property blocks agrees with the map information.

5. The method of claim 2, wherein the plurality of property blocks include at least one of a starting block, a game block, a trap block, a moving block, a selection block, a quiz block, an item block, and a finish block.

6. The method of claim 5, wherein the game progress information derives from one or more actions performed through a board game application installed on any of the plurality of mobile terminals, the game progress information including at least one of digital dice manipulation result information, skip turn information, obtain item information, and event performance result information.

7. The method of claim 6, wherein the response information includes at least one of the digital dice manipulation result information, an event for a property block to which a user's piece block is moved according to the digital dice manipulation result, and a result of performing the event.

8. The method of claim 7, wherein either a private level or a sharing level is set for the game progress information, response information for game progress information set to the sharing level is transmitted to the common screen device and the plurality of mobile terminals, and response information for game progress information set to the private level is transmitted only to one of the plurality of mobile terminals.

9. The method of claim 1, further comprising:
transmitting at least one of a game room list and individual user information to the common screen device and the plurality of mobile terminals prior to the start of the board game,
wherein the individual user information includes at least one of a user ID, a level, a record of wins and losses, and a number of points retained.

10. The method of claim 1, wherein a board game application installed on each of the plurality of mobile terminals outputs a game interface for manipulating digital dice, one of keeping, buying, selling, and exchanging an item, and at least one of attacking and defending by use of the item.

11. A method for providing a mirror-world based digital board game realized by a plurality of independent operating components including a server, a common screen device, a plurality of mobile terminals, and a board assembly including a physical gameboard, the method comprising:
receiving, at the common screen device, at least one of map information and game story information for the board game from the server, the common screen device being connected over a network with the server and configured to perform near-field communication with the board assembly;
receiving, at the common screen device, arrangement information regarding an arrangement of a plurality of property blocks on the gameboard from the board assembly;
determining, by the common screen device, whether or not the arrangement of the plurality of property blocks on the gameboard is consistent with the map information;
outputting, by the common screen device, an image corresponding to the arrangement of the plurality of property blocks on the gameboard when the arrangement of the plurality of property blocks on the gameboard is consistent with the map information;
receiving, at the common screen device, response information corresponding to game progress information of the plurality of mobile terminals from the server, once an arrangement of the plurality of property blocks on the gameboard is completed and the board game is started; and
displaying, by the common screen device, an image corresponding to the response information.

12. The method of claim 11, further comprising:
receiving piece block arrangement information regarding piece blocks moving over the plurality of property blocks; and
displaying an image according to a movement of the piece blocks.

13. A method for providing a mirror-world based digital board game realized by a plurality of independent operating components including a server, a common screen device, a plurality of mobile terminals, and a board assembly including a physical gameboard, the method comprising:
transmitting, from a mobile terminal of the plurality of mobile terminals, game progress information corresponding to a user manipulation of the mobile terminal to the server, once an arrangement of a plurality of property blocks on the gameboard is completed according to map information transmitted to the common screen device and the board game is started, the mobile terminal being connected over a network with the server; and
receiving, at the mobile terminal, response information corresponding to the game progress information from the server,
wherein the common screen device performs near-field communication with the board assembly to recognize an arrangement of the plurality of property blocks and piece blocks placed over the plurality of property blocks on the gameboard and displays an image corresponding thereto and an image corresponding to the response information.

14. A server apparatus for providing a mirror-world based digital board game realized by a plurality of independently operating components including the server apparatus, a common screen device, a plurality of mobile terminals, and a board assembly including a physical gameboard, the server apparatus comprising:
a communication module configured to transmit at least one of map information and game story information for the board game to the common screen device; and
a game progress control module configured to receive game progress information from the plurality of mobile terminals and generate response information corresponding to the game progress information, once an arrangement of a plurality of property blocks on the gameboard is completed according to the map information and the board game is started, wherein the communication module transmits the response information to the common screen device, the common screen device performs near-field communication with the board assembly to recognize an arrangement of the plurality of property blocks and piece blocks placed over the plurality of property blocks on the gameboard and displays an image corresponding thereto and an image corresponding to the response information, and the server apparatus is connected over a network with the common screen device and the plurality of mobile terminals.

\* \* \* \* \*